(12) United States Patent
Landi

(10) Patent No.: US 12,299,444 B2
(45) Date of Patent: May 13, 2025

(54) ARITHMETIC UNIT FOR REDUCED INSTRUCTION SET COMPUTER PROCESSORS AND RELATED METHOD, SYSTEM AND DEVICE

(71) Applicant: STMicroelectronics International N.V., Geneva (CH)

(72) Inventor: Sofiane Landi, San Mango Piemonte (IT)

(73) Assignee: STMicroelectronics International N.V., Geneva (CH)

( * ) Notice: Subject to any disclaimer, the term of this patent is extended or adjusted under 35 U.S.C. 154(b) by 34 days.

(21) Appl. No.: 18/323,049

(22) Filed: May 24, 2023

(65) Prior Publication Data

US 2024/0394056 A1   Nov. 28, 2024

(51) Int. Cl.
  *G06F 9/30* (2018.01)
  *G06F 9/345* (2018.01)

(52) U.S. Cl.
  CPC ........ *G06F 9/3001* (2013.01); *G06F 9/30134* (2013.01); *G06F 9/345* (2013.01)

(58) Field of Classification Search
  CPC ..... G06F 9/3001; G06F 9/30134; G06F 9/345
  See application file for complete search history.

(56) References Cited

U.S. PATENT DOCUMENTS

| | | | | |
|---|---|---|---|---|
| 4,258,419 | A | * | 3/1981 | Blahut ................ G06F 9/30076 712/210 |
| 5,757,685 | A | * | 5/1998 | Ohuchi .................. G06F 7/575 708/518 |
| 9,684,632 | B2 | * | 6/2017 | Walker ................ G06F 15/7842 |
| 2018/0088905 | A1 | | 3/2018 | Klein et al. |
| 2019/0212984 | A1 | | 7/2019 | Boersma et al. |
| 2022/0100468 | A1 | | 3/2022 | Han et al. |
| 2022/0129244 | A1 | | 4/2022 | Pugh et al. |
| 2022/0382360 | A1 | | 12/2022 | Pope et al. |

\* cited by examiner

*Primary Examiner* — Corey S Faherty
(74) *Attorney, Agent, or Firm* — Seed IP Law Group LLP

(57) ABSTRACT

A system includes a memory and a processor coupled to the memory. The processor executes an instruction set having a word size. The processor includes arithmetic processing circuitry, which, in operation, executes arithmetic operations on operands having the word size. The arithmetic processing circuitry includes an arithmetic logic circuit (ALU) having an operand size smaller than the word size of the instruction set. The ALU, in operation, generates partial results of the arithmetic operations. A multiplexing network coupled to inputs of the ALU provides portions of the operands to the ALU. A shift register having the word size of the instruction set accumulates partial results generated by the ALU over a plurality of clock cycles and outputs results of the arithmetic operations based on the accumulated partial results.

20 Claims, 7 Drawing Sheets

ARITHMETIC UNIT FOR REDUCED INSTRUCTION SET COMPUTER PROCESSORS AND RELATED METHOD, SYSTEM AND DEVICE

BACKGROUND

Technical Field

The present disclosure generally relates to arithmetic units or circuits in processors, such as reduced instruction set computer (RISC) processors, including arithmetic units or circuits embedded in RISC-V processors.

Description of the Related Art

Reduced instruction set processors, such as RISC-V processors, are increasingly being employed to embed general purpose control logic for Internet-of-Things (IOT) applications, such as sensor systems, etc. For example, an embedded system may have one or more sensors, an analog front end coupled to the one or more sensors, and a digital backend including one or more RISC processors, such as one or more RISC-V processors, to process the information generated by the sensors and generate control signals or processed data. RISC processors may also be employed in high-speed, high performance multiprocessor applications. RISC-V processors use an open-source instruction set, which may reduce costs associated with the processors, such as royalties.

Processors typically include an arithmetic unit or circuit embedded in the processor. The arithmetic unit typically performs arithmetic processing operations associated with processing information received by the processor (e.g., data generated by the sensors; a data stream of a complex process; modeling parameters; etc.), generating control signals, and generating processed data.

BRIEF SUMMARY

In an embodiment, a processor comprises a memory, and arithmetic processing circuitry coupled to the memory. The arithmetic processing circuitry, in operation, performs an arithmetic operation on M-bit operands over a number of clock cycles N, where M and N are positive integers greater than 1. The arithmetic processing circuitry includes: an L-bit arithmetic logic circuit (ALU), which, in a first mode of operation of the arithmetic processing circuitry, performs arithmetic operations on portions of the M-bit operands in clock cycles of the N clock cycles, generating L-bit partial results of the arithmetic operation on the M-bit operands, where L is a positive integer less than M; a multiplexing network coupled to inputs of the L-bit ALU, wherein the multiplexing network, in the first mode of operation of the arithmetic processing circuitry, provides selected portions of the M-bit operands to the L-bit ALU in clock cycles of N clock cycles; and an M-bit shift register coupled to an output of the L-bit ALU, wherein the M-bit shift register, in the first mode of operation of the arithmetic processing circuitry, accumulates the L-bit partial results generated by the L-bit ALU during clock cycles of the N clock cycles and outputs a result of the arithmetic operation on the M-bit operands based on the accumulated L-bit partial results.

In an embodiment, a system comprises a memory, and a processor coupled to the memory. The processor, in operation, executes an instruction set having a word size. The processor includes arithmetic processing circuitry, which, in operation, executes arithmetic operations on operands having the word size. The arithmetic processing circuitry includes: at least one arithmetic logic circuit (ALU) having an operand size smaller than the word size of the instruction set, wherein the at least one ALU, in operation, generates partial results of the arithmetic operations in a clock cycle; a multiplexing network coupled to inputs of the at least one ALU, wherein the multiplexing network, in operation, provides portions of the operands to the at least one ALU in a clock cycle; and a shift register having the word size of the instruction set and coupled to an output of the at least one ALU, wherein the shift register, in operation, accumulates partial results generated by at least one ALU over a plurality of clock cycles and outputs results of the arithmetic operations based on the accumulated partial results.

In an embodiment, a method comprises: executing, on a processor having an instruction set having a word size, an arithmetic operation on operands having the word size, the executing the arithmetic operation including: providing, using a multiplexing network of the processor, portions of the operands of the arithmetic operation to an arithmetic logic circuit (ALU) of the processor, the ALU having an operand size smaller than the word size of instruction set; generating, using the ALU, partial results of the arithmetic operation; accumulating, using a shift register of the processor, the shift register having the word size and coupled to an output of the at least one ALU, the partial results generated by the ALU; and generating a result of the arithmetic operation based on the accumulated partial results.

In an embodiment, a non-transitory computer-readable medium's contents configure a processor having an instruction set having a word size to perform a method. The method comprises: executing an arithmetic operation on operands having the word size of the instruction set, the executing the arithmetic operation including: providing, using a multiplexing network of the processor, portions of the operands of the arithmetic operation to an arithmetic logic circuit (ALU) of the processor, the ALU having an operand size smaller than the word size of instruction set; generating, using the ALU, partial results of the arithmetic operation; accumulating, using a shift register of the processor, the shift register having the word size, the partial results generated by the ALU; and generating a result of the arithmetic operation based on the accumulated partial results.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, arithmetic logic units or circuits, control registers, bus systems, etc., in a RISC-V processor environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
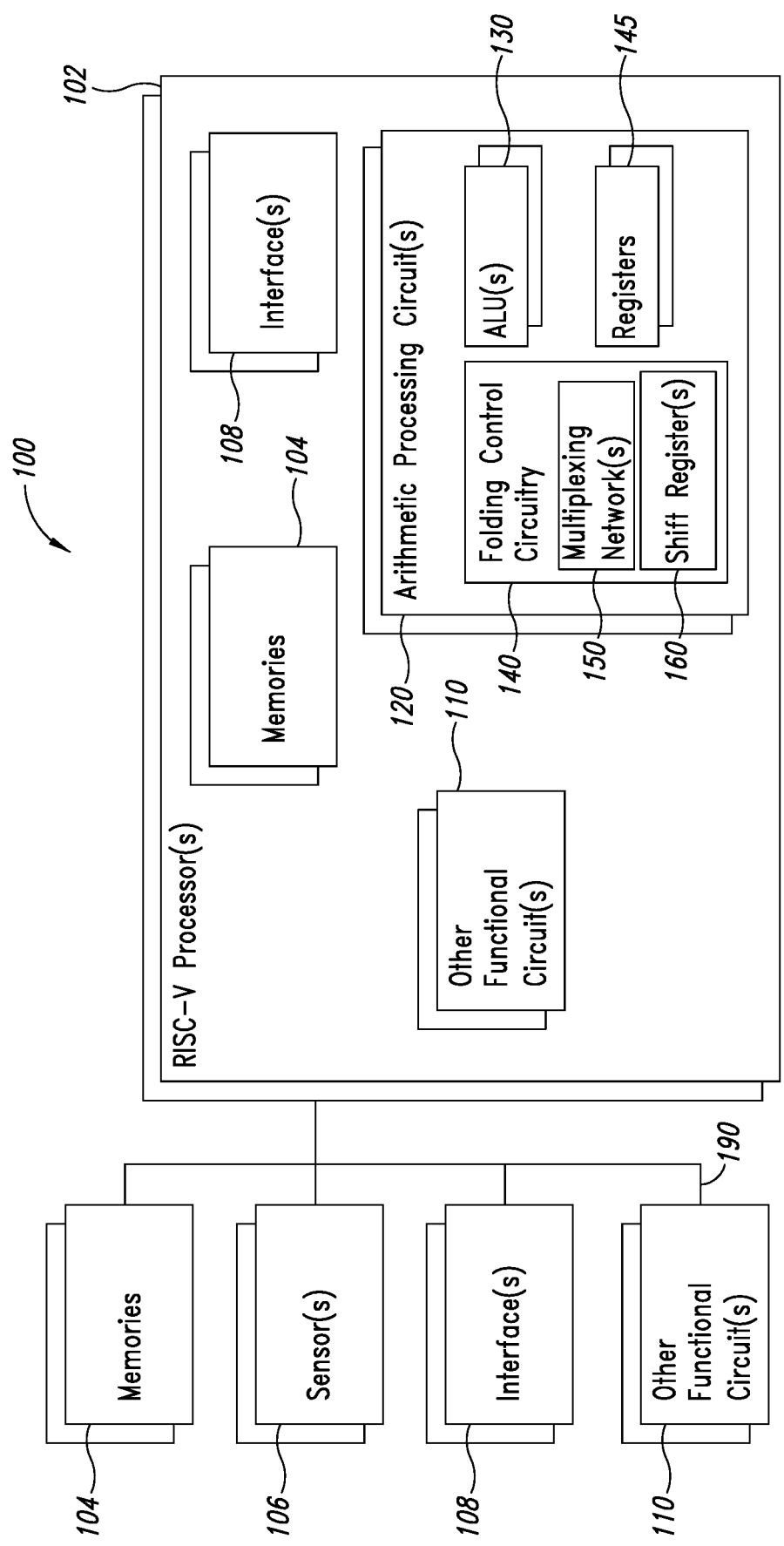
FIG. 1 is a functional block diagram of an embodiment of an electronic device or system incorporating the presently disclosed technology.

FIG. 1 is a functional block diagram of an embodiment of an electronic device or system 100 of the type to which described embodiments may apply. The system 100 comprises one or more processing cores or circuits 102. As illustrated, the one or more processing cores comprise one or more RISC-V processors. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify sensor data, programs which classify images using CNNs), etc. Various combinations of different types of processors may be employed in some embodiments (e.g., one or more RISC-V processors, one or more ARM processors, one or more complex instruction set processor, or various combinations thereof).

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 may include one or more sensors 106 (e.g., image sensors, audio sensors, accelerometers, pressure sensors, temperature sensors, etc.), one or more interfaces 108 (e.g., wireless communication interfaces, wired communication interfaces, bus system interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to the various components of the system 100. Proprietary bus systems and interfaces may be employed, such as Advanced eXtensible Interface (AXI) bus systems and interfaces.

The processor 102 as illustrated includes one or more internal memories 104, one or more interfaces 108, one or more internal functional logic circuits 110. As mentioned above, the one or more internal memories 104, may include one or more volatile and/or non-volatile memories which may store, for example, all or part of instructions and data related to control of the system 100, applications and operations performed by the system 100, etc., and may include memory arrays (e.g., an internal cache memory), general purpose registers, etc., which, in operation, may be shared by one or more processes executed by the system 100. The one or more interfaces 108 may include wireless communication interfaces, wired communication interfaces, bus system interfaces, etc., and the other functional circuits 110, which may include antennas, power supplies, one or more built-in self-test (BIST) circuits, etc.

Figure 2:
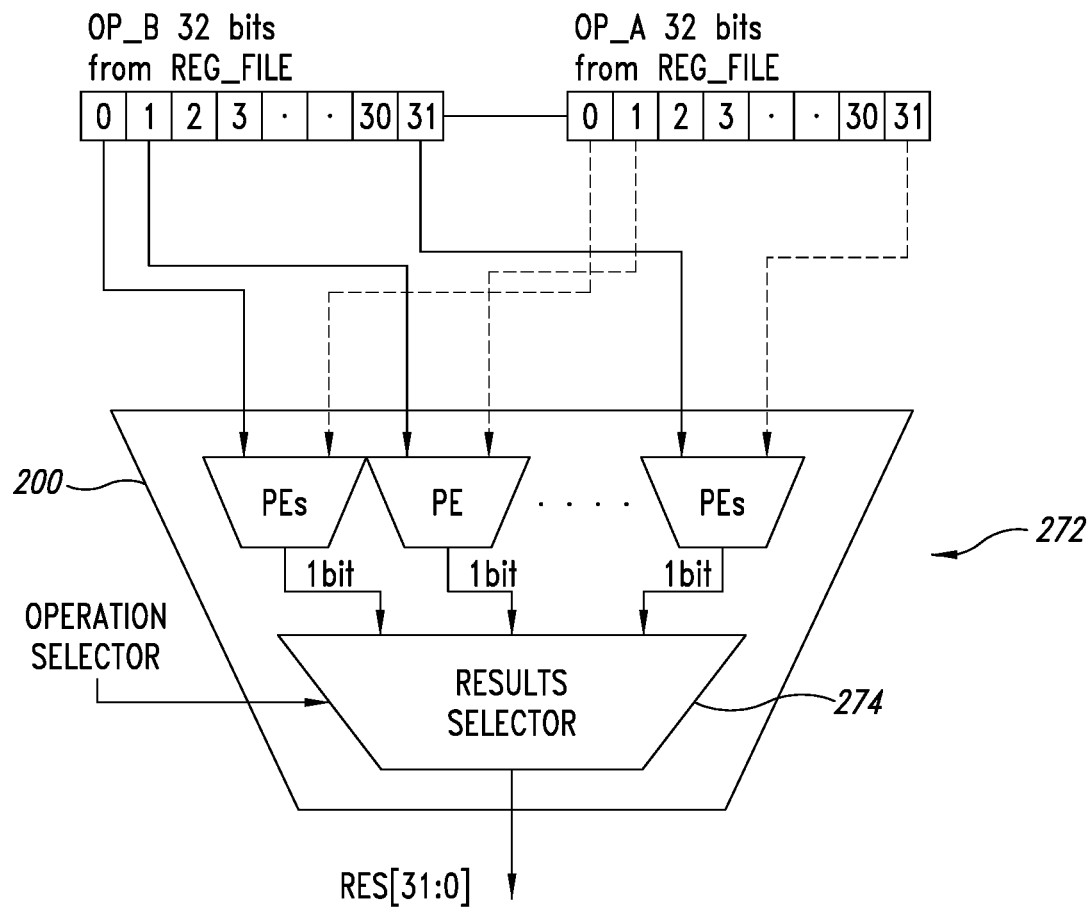
FIG. 2 is a functional block diagram of an arithmetic logic unit (ALU) that may be embedded in a processor.

Typically, a processor includes one or more arithmetic logic units (ALU) or circuits to perform arithmetic operations associated with processes executed or controlled by the processor. FIG. 2 is a functional block diagram of a typical ALU 200 that may be embedded in a processor. The ALUs typically have an operand size equal to a word size of the processor or to the size of the instruction set associated with the processor (e.g., a word size of a RISC-V instruction set). In the illustrated example of FIG. 2, the processor 102 employs a 32-bit instruction set and the ALU 200 is configured to operate on 32-bit operands, operand A and operand B as illustrated, to produce a 32-bit result. Other bit sizes may be employed (e.g., a processor employing a 64-bit instruction set with an ALU configured to operate on 64-bit operands, a processor employing a 128-bit instruction set with an ALU configured to operate on 128-bit operands, etc.). The ALU 200 includes a number of processing elements 272 and results selection circuitry 274. The number of processing elements 272 included in the ALU 200 is typically a function of the bit size of the operands and the logic functions the ALU 200 is configured to perform (e.g., add, subtract, shift, etc.). For example, to perform a 32-bit add operation, the ALU 200 may include 32 processing elements 272, each of which receives a bit of each of the respective operands.

Figure 3:
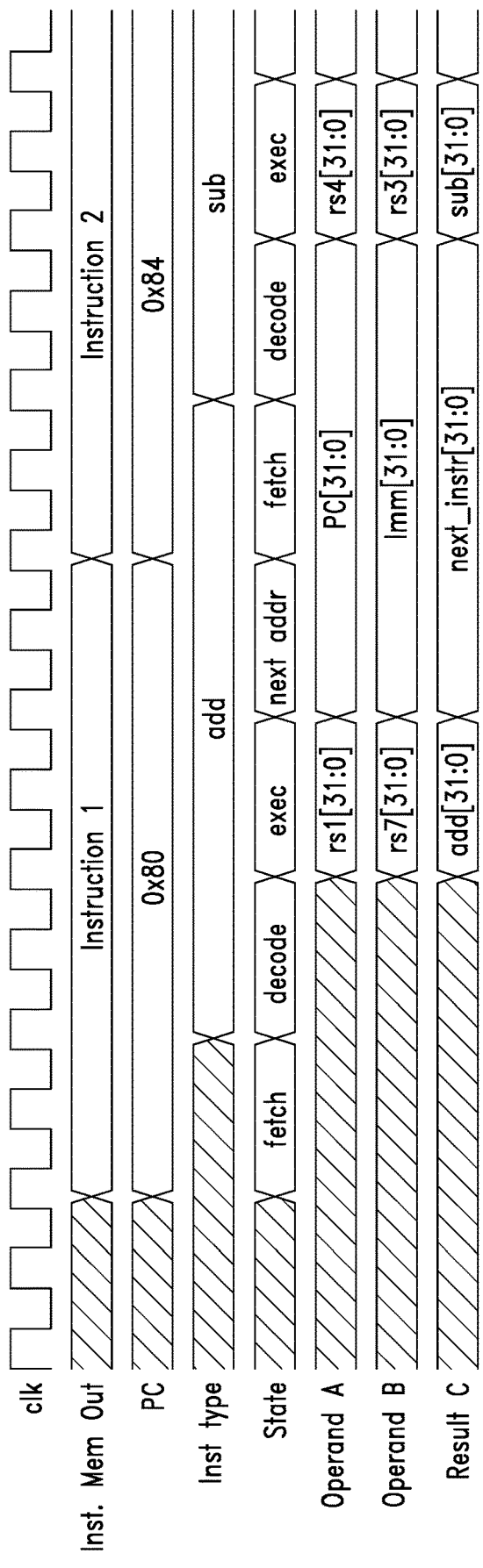
FIG. 3 is a timing diagram illustrating an example processor timeline associated with performing operations using an ALU.

FIG. 3 is a timing diagram illustrating example processor signal and state timing associated with executing arithmetic operations by an ALU, such as the ALU 200 of FIG. 2. For convenience, FIG. 3 will be described with reference to FIG. 2. In FIG. 3, the clk represents a processor clock signal, Inst Mem Out represents an output of an instruction memory (e.g., instruction 1, instruction 2, etc.), PC represents a program counter, Inst Type represents a type of a current arithmetic instruction (e.g., addition, subtraction, shifting), State represents a state of the processor (e.g., fetch an instruction, decode an instruction, execute an instruction, determine a next instruction to be fetched from an instruction memory, etc.), Operand A represents a first operand stored in a first register (e.g., rs1), Operand B represents a second operand stored in a second register (e.g., rs7), and Result C represents a result of performing a current arithmetic operation on the first and second operands.

As illustrated, a first instruction is fetched and decoded, and is determined to be an instruction to perform an addition operation. In a single execution clock cycle the addition instruction is executed. As illustrated, pairs of individual bits of a 32-bit operand A (rs1[31:0]) and individual bits of a 32-bit operand B (rs7[31:0]) are provided to 32 processing elements 272, and the selection circuitry 274 combines the available outputs of the 32 processing elements 272 to provide a 32-bit output (add[31:0]) of the arithmetic operation.

After the addition operation is executed, a next instruction is fetched and decoded. The registers and the ALU may be reused in the fetching and decoding process in a known manner. As illustrated, the next instruction is determined to be a subtraction instruction. In a single execution clock cycle the subtraction instruction is executed. As illustrated, pairs of individual bits of a 32-bit operand A (rs4[31:0]) and individual bits of a 32-bit operand B (rs3[31:0]) are provided to 32 processing elements 272, and the selection circuitry 274 combines the available outputs of the 32 processing elements 272 to provide a 32-bit output (sub [31:0]) of the arithmetic operation.

ALUs, such as the ALU 200 of FIG. 2, typically require a significant amount of area due to the number of processing elements (e.g., 32 processing elements to perform a 32-bit add operation) and results selection circuitry associated with the operations the ALU 200 is configured to perform, and may impose significant limitations in terms of clock frequency and the amount of area available for other functional circuitry in a processor. ALUs also typically use a significant amount of power in a clock cycle performing multiple parallel operations using multiple processing elements (e.g., 32 processing elements) on operands having a size corresponding to a word size of the processor or the instruction set.

To facilitate reducing the area and power requirements associated with performing arithmetic operations, the processor 102 of the system 100 of FIG. 1 includes one or more arithmetic processing circuits or circuitry 120 which employ folding techniques to perform arithmetic operations, as discussed in more detail below. The arithmetic processing circuits 120 have a word size M which may typically correspond to a word size or instruction set word size of the processor. As illustrated, the arithmetic processing circuits 120 one or more ALU circuits 130, folding control circuitry 140, and one or more registers 145.

The ALU circuits 130 each have an operand size (e.g., an operand size L) smaller than an operand size M of the arithmetic logic circuit 120, e.g., smaller than a word size of the processor 102 or a word size of the instruction set employed by the processor 120. The folding control circuitry 140 manages the flow of data in the arithmetic processing circuit 120 to facilitate the use of ALUs 130 having a smaller operand size than the operand or instruction set word size of the arithmetic processing circuitry 120. The use of folding techniques by the arithmetic processing circuits 120 also facilitates reducing the area and power requirements of the processor 102, and provides more flexibility with regard to the operating frequency, as compared to the use of conventional ALUs having an operand size equal to a word size of the processor or to the word size of the instruction set of the processor. As illustrated, the folding control circuitry 140 includes one or more multiplexing networks 150 and one or more shift registers 160.

The one or more registers 145 may store data and control information associated with the performance of operations by the arithmetic processing circuitry (e.g., operands or results). The registers 145 may be dedicated or multi-purpose registers.

Embodiments of the system 100 of FIG. 1 may include more components than illustrated, may include fewer components than illustrated, may combine components, may separate components into sub-components, and various combination thereof. For example, various intellectual properties (IPs) of the RISC-V processor 102 (e.g., the other functional circuits 110) may include dedicated data and control registers to store data and control information. In another example, cryptographic circuitry may be included various components of the system 100 (e.g., the bus system 190, the sensors 106, etc., or as an additional component of the system 100). In another example, the system 100 may include one or more hardware accelerators (e.g., convolutional accelerators, video processors, etc). In another example, one or more of the registers 145 may be coupled to the arithmetic processing circuitry 120, instead of incorporated into the arithmetic processing circuitry 120 as illustrated.

Figure 4:
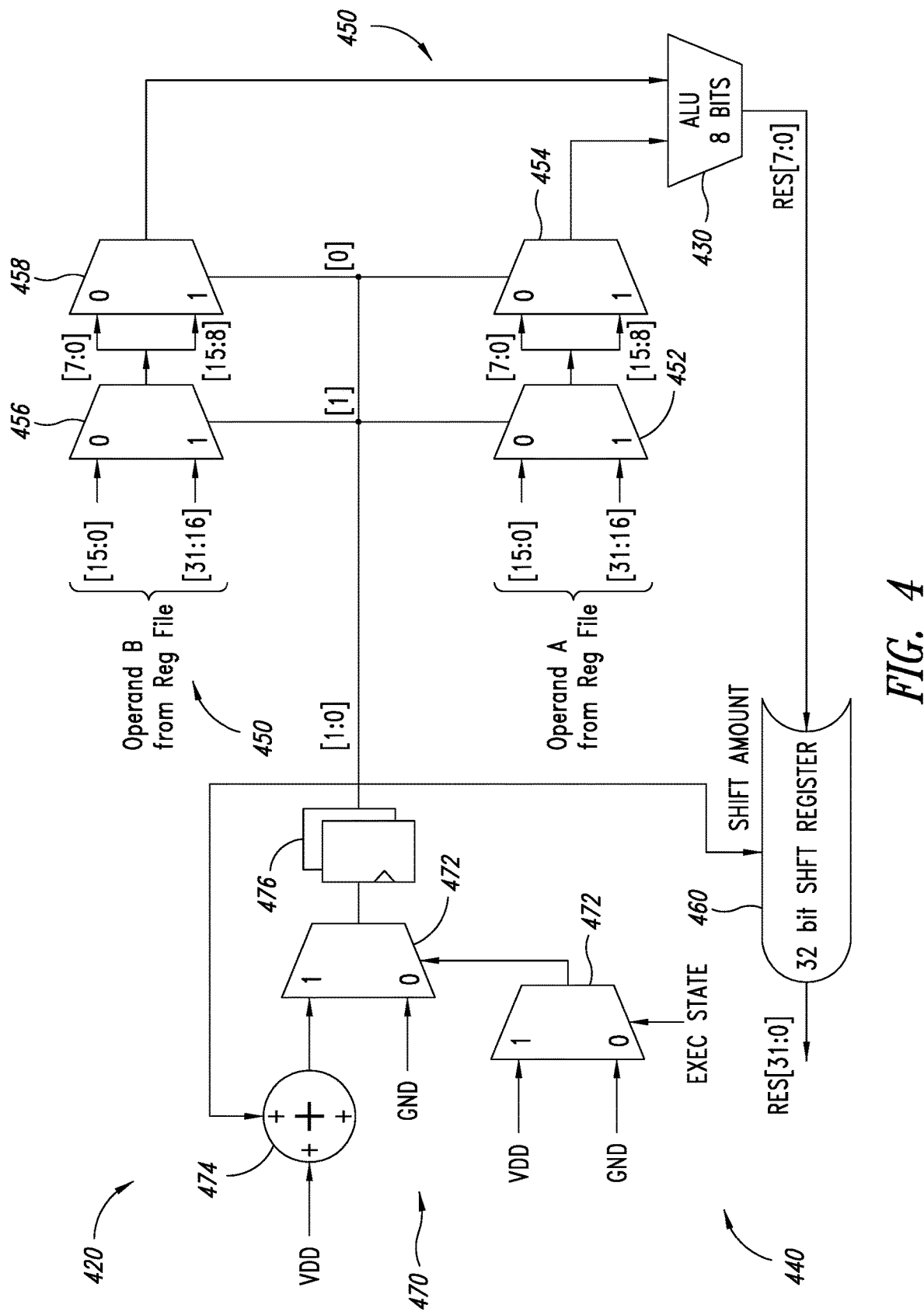
FIG. 4 is a functional block diagram of an embodiment of arithmetic processing circuitry employing folding techniques.

FIG. 4 is a functional block diagram of an embodiment of arithmetic processing circuitry 420, that may be employed, for example, as the arithmetic processing circuit 120 in the processor 102 of FIG. 1. As illustrated, the arithmetic processing circuitry 420 has a word size M of 32 bits and employs a folding factor N of four, which may be a fixed folding factor or a variable folding factor (see FIG. 6). Other fixed folding factors may be employed (e.g., 2, 8 or 16), and folding may be selectively enabled in some embodiments.

The arithmetic processing circuitry 420 includes an ALU 430 having a word size L of 8 bits (the 32-bit word size of the arithmetic logic circuit 420 divided by the folding factor of 4), and folding control circuitry 440. The folding control circuitry 440, as illustrated, includes a multiplexing network 450, a 32-bit shift register 460, and control circuitry 470. The multiplexing network 450 includes four multiplexers 452, 454, 456 and 458. The control circuitry 470 includes multiplexers 472, an adder 474, and counters 476 (as illustrated, flip flops).

Figure 5:
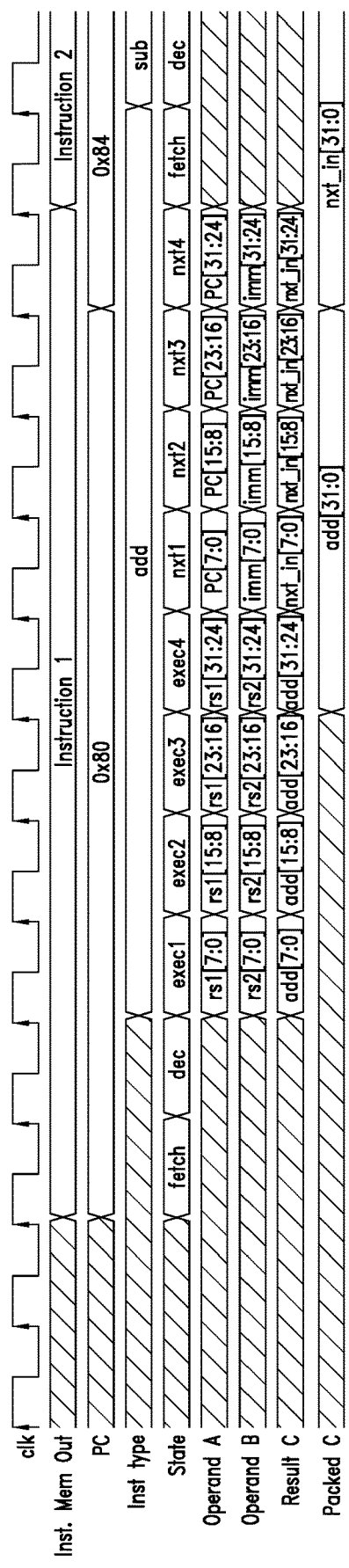
FIG. 5 is a timing diagram illustrating an example processor timeline associated with performing operations using arithmetic processing circuitry employing folding techniques.

FIG. 5 is a timing diagram illustrating example processor signal and state timing associated with executing arithmetic operations by arithmetic processing circuitry employing a folding factor of 4, such as the arithmetic processing circuit 420 of FIG. 4. For convenience, FIG. 5 will be described with reference to FIGS. 1 and 4. As illustrated, the type of a first arithmetic operation is an add operation, and the type of a second arithmetic operation is a subtract operation.

In a first clock cycle, the control circuitry 470 controls multiplexers 452 and 454 of the multiplexer network 450 to provide bits 0-7 of operand A to the 8-bit ALU 430, and controls multiplexers 456 and 458 of the multiplexer network 450 to provide bits 0-7 of operand B to the 8-bit ALU 430. The ALU 430 generates a first 8-bit result, as illustrated, add [7:0]. The control circuitry controls the shift register 460 to load the first 8-bit result.

In a second clock cycle, the control circuitry 470 controls multiplexers 452 and 454 of the multiplexer network 450 to provide bits 15-8 of operand A to the 8-bit ALU 430, and controls multiplexers 456 and 458 of the multiplexer network 450 to provide bits 15-8 of operand B to the 8-bit ALU 430. The ALU 430 generates a second 8-bit result, as illustrated, add [15-8]. The control circuitry 470 controls the shift register 460 to shift the first 8-bit result, and to load the second 8-bit result.

In a third clock cycle, the control circuitry 470 controls multiplexers 452 and 454 of the multiplexer network 450 to provide bits 23-16 of operand A to the 8-bit ALU 430, and controls multiplexers 456 and 458 of the multiplexer network 450 to provide bits 23-16 of operand B to the 8-bit ALU 430. The ALU 430 generates a third 8-bit result, as illustrated, add [23-16]. The control circuitry 470 controls the shift register 460 to shift the first 8-bit result and the second 8-bit result, and to load the third 8-bit result.

In a fourth clock cycle, the control circuitry 470 controls multiplexers 452 and 454 of the multiplexer network 450 to provide bits 31-24 of operand A to the 8-bit ALU 430, and controls multiplexers 456 and 458 of the multiplexer network 450 to provide bits 31-24 of operand B to the 8-bit ALU 430. The ALU 430 generates a fourth 8-bit result, as illustrated, add [31-24]. The control circuitry 470 controls the shift register 460 to shift the first 8-bit result, the second 8-bit result, and the third 8-bit result, and to load the fourth 8-bit result, generating a packed result add [31:0].

After the addition operation is executed, a next instruction is fetched and decoded. In some embodiments, the arithmetic processing circuitry 120 may be employed to fetch and decode the next instruction. As illustrated, in a fifth clock cycle, the control circuitry 470 controls multiplexers 452 and 454 of the multiplexer network 450 to provide bits 0-7 of the program counter (corresponding to operand A as illustrated) to the 8-bit ALU 430, and controls multiplexers 456 and 458 of the multiplexer network 450 to provide bits 0-7 of the instruction memory output (corresponding to operand B as illustrated) to the 8-bit ALU 430. The ALU 430 generates a first 8-bit result of the next instruction, as illustrated, [7:0]. The control circuitry controls the shift register 460 to load the first 8-bit result of the next instruction.

In a sixth clock cycle, the control circuitry 470 controls multiplexers 452 and 454 of the multiplexer network 450 to provide bits 15-8 of the program counter to the 8-bit ALU 430, and controls multiplexers 456 and 458 of the multiplexer network 450 to provide bits 15-8 of the instruction memory output to the 8-bit ALU 430. The ALU 430 generates a second 8-bit result of the next instruction. The control circuitry 470 controls the shift register 460 to shift the first 8-bit result of the next instruction, and to load the second 8-bit result of the next instruction.

In a seventh clock cycle, the control circuitry 470 controls multiplexers 452 and 454 of the multiplexer network 450 to provide bits 23-16 of the program counter to the 8-bit ALU 430, and controls multiplexers 456 and 458 of the multiplexer network 450 to provide bits 23-16 of the instruction memory output to the 8-bit ALU 430. The ALU 430 generates a third 8-bit result of the next instruction. The control circuitry 470 controls the shift register 460 to shift the first 8-bit result and the second 8-bit result of the next instruction, and to load the third 8-bit result of the next instruction.

In an eighth clock cycle, the control circuitry 470 controls multiplexers 452 and 454 of the multiplexer network 450 to provide bits 31-24 of the program counter to the 8-bit ALU 430, and controls multiplexers 456 and 458 of the multiplexer network 450 to provide bits 31-24 of the instruction memory output to the 8-bit ALU 430. The ALU 430 generates a fourth 8-bit result of the next instruction. The control circuitry 470 controls the shift register 460 to shift the first 8-bit result, the second 8-bit result, and the third 8-bit result of the next instruction, and to load the fourth 8-bit result, generating a packed result of the next instruction. As illustrated, the next instruction is determined to be a subtraction instruction, which may be processed in a manner similar to the processing of the addition instruction.

Figure 6:
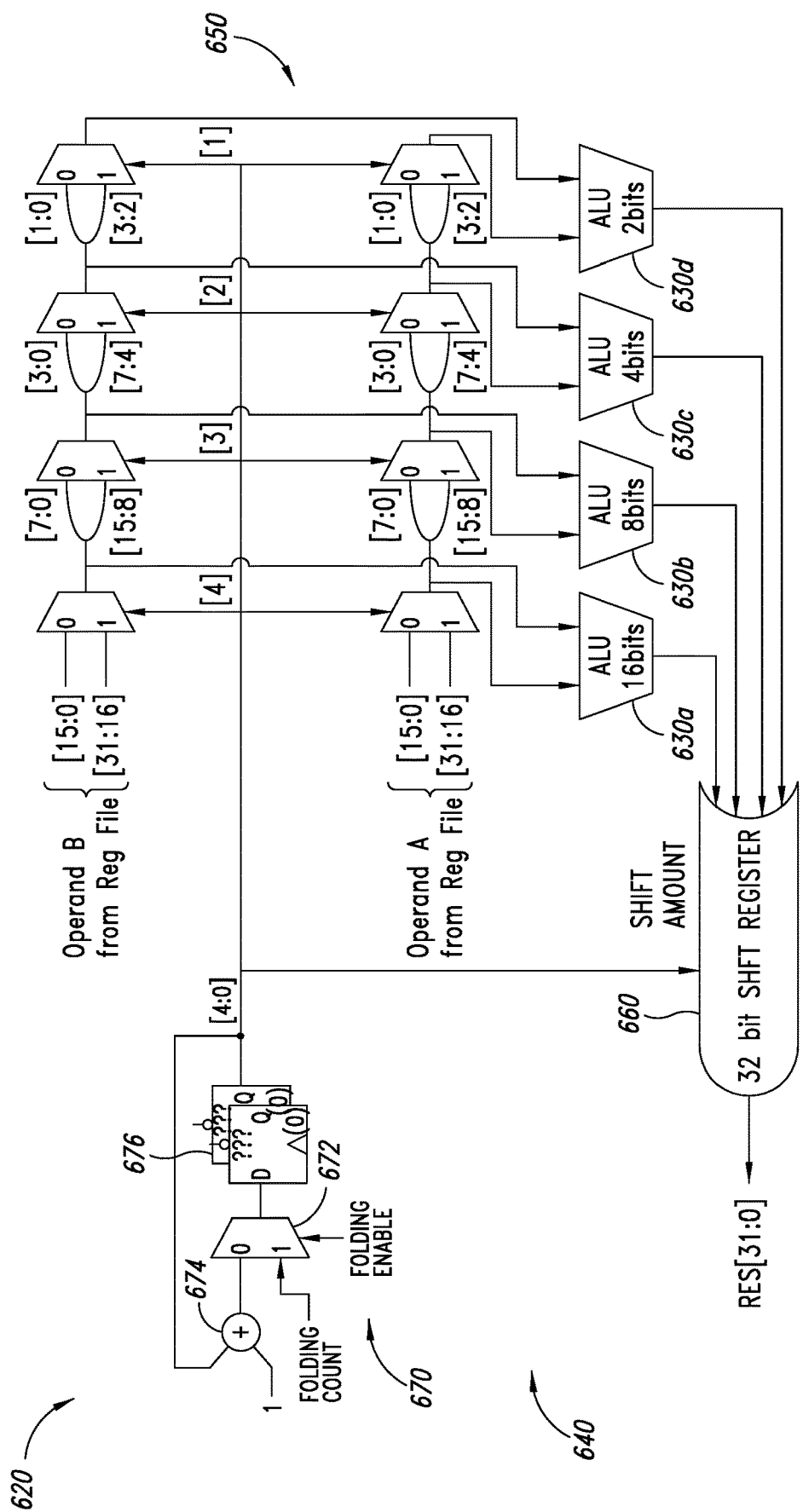
FIG. 6 is a functional block diagram illustrating an embodiment of arithmetic processing circuitry employing folding techniques with a variable folding factor.

FIG. 6 is a functional block diagram of an embodiment of arithmetic processing circuitry 620, that may be employed, for example, as the arithmetic processing circuit 120 in the processor 102 of FIG. 1. As illustrated, the arithmetic processing circuitry 620 has a word size M of 32 bits and an adjustable folding factor. The arithmetic processing circuitry includes a 16-bit ALU 630a having an operand size L of 16, an 8-bit ALU 630b having an operand size Q of 8, a 4-bit ALU 630c having an operand size R of 4, and a 2-bit ALU 630d having an operand size S of 2. The folding control circuitry 640, as illustrated, includes a multiplexing network 650, a 32-bit shift register 660, and control circuitry 670. The multiplexing network 650 includes eight multiplexers. The control circuitry 670 includes one or more multiplexers 672, an adder 674, and counters 676 (as illustrated, flip flops).

In operation, when the folding factor is 2, the arithmetic processing circuitry 620 executes a 32-bit operation in two clock cycles using the 16-bit ALU 630a. The control circuitry 670 controls the multiplexing network 650 to provide first 16-bit portions of the operands to the 16-bit ALU 630a in a first clock cycle, and to provide second 16-bit portions of the operands to the 16-bit ALU 630a in a second clock cycle. The 16-bit ALU 630a generates a first 16-bit result in the first clock cycle and generates a second 16-bit result in the second clock cycle. The control circuitry 670 controls the 32-bit shift register 660 to load and shift the first and second 16-bit results to generate a 32-bit result of the arithmetic processing circuitry 620.

In operation, when the folding factor is 4, the arithmetic processing circuitry 620 executes a 32-bit operation in four clock cycles using the 8-bit ALU 630b. The operation of the arithmetic processing circuitry 620 of FIG. 6 when the folding factor is 4 is similar to the operation of the arithmetic processing circuitry 420 of FIG. 4. The control circuitry 670 controls the multiplexing network 650 to provide respective 8-bit portions of the 32-bit operands to the 8-bit ALU 630b in each of four clock cycles, and controls the 32-bit shift register 660 to load and shift four sets of 8-bit results to generate a 32-bit result of the arithmetic processing circuitry 620.

In operation, when the folding factor is 8, the arithmetic processing circuitry 620 executes a 32-bit operation in eight clock cycles using the 4-bit ALU 630c. The control circuitry 670 controls the multiplexing network 650 to provide respective 4-bit portions of the 32-bit operands to the 4-bit ALU 630c in each of eight clock cycles, and controls the 32-bit shift register 660 to load and shift eight sets of 4-bit results to generate a 32-bit result of the arithmetic processing circuitry 620.

In operation, when the folding factor is 16, the arithmetic processing circuitry 620 executes a 32-bit operation in sixteen clock cycles using the 2-bit ALU 630d. The control circuitry 670 controls the multiplexing network 650 to provide respective 2-bit portions of the 32-bit operands to the 2-bit ALU 630d in each of sixteen clock cycles, and controls the 32-bit shift register 660 to load and shift sixteen sets of 2-bit results to generate a 32-bit result of the arithmetic processing circuitry 620.

Figure 7:
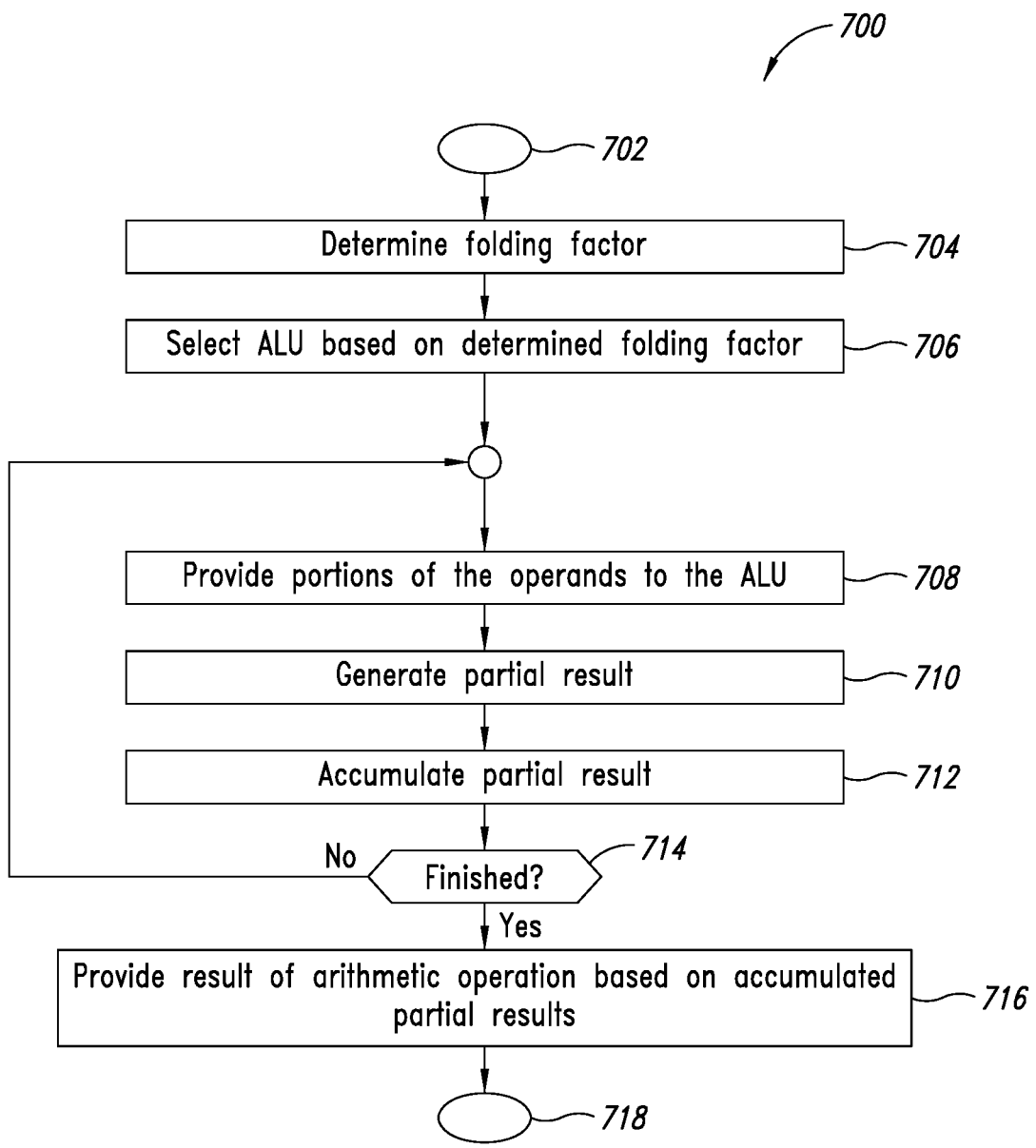
FIG. 7 is a flow diagram illustrating an embodiment of a process performing arithmetic operations using folding techniques.

FIG. 7 illustrates an embodiment of a method 700 of a process for executing an arithmetic operation using folding techniques that may be employed, for example, by the arithmetic processing circuitry 120 of FIG. 1, by the arithmetic processing circuitry 420 of FIG. 4, or by the arithmetic processing circuitry 620 of FIG. 6. For convenience, FIG. 7 will be described with reference to FIGS. 1 and 4-6.

The method 700 starts at 702 and proceeds to 704. At 704, the method 700 optionally determines a folding factor to be employed during the performance of the arithmetic operation on operands having a word size corresponding to an instruction set word size. The folding factor may be determined, for example, based on a configuration parameter, such as a parameter of a program or instruction executed by a processor, a parameter stored in a configuration register, etc. In another example, the folding parameter may be determined based on user input. The method 700 proceeds from 704 to 706.

At 706, the method 700 optionally selects an ALU from a plurality of ALUs based on the determined folding factor. For example, for an instruction set word size of 32 bits and a folding factor of 4, an ALU having an operand size of 8 bits may be selected. The method 700 proceeds from 706 to 708.

At 708, the method 700 provides portions of the operands of the arithmetic operation to the selected ALU. This may be done, for example, by controlling a multiplexing network of the processor (e.g., the multiplexing network 150 of FIG. 1, the multiplexing network 450 of FIG. 4, or the multiplexing network 650 of FIG. 6) to provide selected portions of the operands to the selected ALU. The method 700 proceeds from 708 to 710.

At 710, the method 700 generates a partial result of the arithmetic operation. This may be done, for example, using the ALU 130 of FIG. 1, the ALU 430 of FIG. 4, or the selected one of the ALUs 630a, 630b, 630c, or 630d of FIG. 6. The method 700 proceeds from 710 to 712.

At 712, the method 700 accumulates the partial result of the arithmetic operation. This may be done, for example, using the shift register 160 of FIG. 1, the shift register 460 of FIG. 4, or the shift register 660 of FIG. 6. The method 700 proceeds from 712 to 714.

At 714, the method 700 determines whether the accumulation of the partial results needed to perform the arithmetic operation is finished. This may be determined, for example, based on a folding factor, which may be fixed or variable. When it is not determined that the accumulation of the partial results needed to perform the arithmetic operation is complete, the method 700 returns to 708 to provide additional portions of the operands to the ALU. When it is determined at 714 that the accumulation of the partial results needed to perform the arithmetic operation is finished, the method 700 proceeds from 714 to 716.

At 716, the method provides a result of the arithmetic operation based on the accumulated partial results. The method proceeds from 716 to 718, where the result of the arithmetic operation may be returned, other processing may be performed, the method 700 may terminate, or various combinations thereof.

Embodiments of the foregoing processes and methods may contain additional acts not shown in FIG. 7, may not contain all of the acts shown in FIG. 7, may perform acts shown in FIG. 7 in various orders, may combine acts, may split acts into separate acts, and may be otherwise modified in various respects. For example, an embodiment of FIG. 7 may be modified to omit acts 704 and 706, for example, when the folding factor is fixed and the processor includes a single ALU. While the method 700 of FIG. 7 is described as performing acts sequentially, it is to be understood that acts may be performed in parallel. For example, acts 708, 710 and 712 may be performed in parallel instead of sequentially.

As mentioned above, the use of folding techniques (e.g., performing arithmetic operations using an ALU having an operand size smaller than a word size of a processor instruction set) by the arithmetic processing circuit of a processor facilitates reducing the area and power requirements of the processor, and provides more flexibility with regard to the operating frequency. For example, simulations have shown that using a folding factor of four the number of gates required may be reduced from 15 K gates to approximately 11 K gates, with a corresponding reduction in area, and the reduced area allows an increase in the operating frequency from 15 MHz to 30 MHz.

In an embodiment, a processor comprises a memory, and arithmetic processing circuitry coupled to the memory. The arithmetic processing circuitry, in operation, performs an arithmetic operation on M-bit operands over a number of clock cycles N, where M and N are positive integers greater than 1. The arithmetic processing circuitry includes: an L-bit arithmetic logic circuit (ALU), which, in a first mode of operation of the arithmetic processing circuitry, performs arithmetic operations on portions of the M-bit operands in clock cycles of the N clock cycles, generating L-bit partial results of the arithmetic operation on the M-bit operands, where L is a positive integer less than M; a multiplexing network coupled to inputs of the L-bit ALU, wherein the multiplexing network, in the first mode of operation of the arithmetic processing circuitry, provides selected portions of the M-bit operands to the L-bit ALU in clock cycles of N clock cycles; and an M-bit shift register coupled to an output of the L-bit ALU, wherein the M-bit shift register, in the first mode of operation of the arithmetic processing circuitry, accumulates the L-bit partial results generated by the L-bit ALU during clock cycles of the N clock cycles and outputs a result of the arithmetic operation on the M-bit operands based on the accumulated L-bit partial results.

In an embodiment, the L-bit ALU includes a number of processing elements greater than or equal to the positive integer L. In an embodiment, the processor is a reduced instruction set processor. In an embodiment, an instruction set of the processor has a word size of M-bits. In an embodiment, M, N and L are powers of 2. In an embodiment, N is a fixed value of 4. In an embodiment, the arithmetic processing circuitry comprises control logic, which, in operation, generates signals to control the multiplexing network and to control the M-bit shift register.

In an embodiment, N is selectable and the arithmetic processing circuitry comprises: a Q-bit ALU, which, in a second mode of operation of the arithmetic processing circuitry, performs arithmetic operations on portions of the M-bit operands in clock cycles of the N clock cycles, generating Q-bit partial results of the arithmetic operation on the M-bit operands, where Q is a positive integer less than M and different from L, wherein, in the second mode of operation, the multiplexing network provides selected portions of the M-bit operands to the Q-bit ALU in clock cycles of N clock cycles; and the M-bit shift register accumulates the Q-bit partial results generated by the Q-bit ALU during clock cycles of the N clock cycles and outputs a result of the arithmetic operation on the M-bit operands based on the accumulated Q-bit partial results. In an embodiment, the arithmetic processing circuitry comprises an M-bit ALU, and in a second mode of operation, the M-bit ALU performs an arithmetic operation on M-bit operands in a clock cycle.

In an embodiment, a system comprises a memory, and a processor coupled to the memory. The processor, in operation, executes an instruction set having a word size. The processor includes arithmetic processing circuitry, which, in operation, executes arithmetic operations on operands having the word size. The arithmetic processing circuitry includes: at least one arithmetic logic circuit (ALU) having an operand size smaller than the word size of the instruction set, wherein the at least one ALU, in operation, generates partial results of the arithmetic operations in a clock cycle; a multiplexing network coupled to inputs of the at least one ALU, wherein the multiplexing network, in operation, provides portions of the operands to the at least one ALU in a clock cycle; and a shift register having the word size of the instruction set and coupled to an output of the at least one ALU, wherein the shift register, in operation, accumulates partial results generated by at least one ALU over a plurality of clock cycles and outputs results of the arithmetic operations based on the accumulated partial results.

In an embodiment, the arithmetic processing circuitry comprises control logic, which, in operation, generates signals to control the multiplexing network and to control the shift register. In an embodiment, the at least one ALU comprises a plurality of ALUs each having a respective operand size smaller than the word size of the instruction set. In an embodiment, the control logic, in operation, selects one of the plurality of ALUs to perform an arithmetic operation over the plurality of clock cycles. In an embodiment, the control logic, in operation, selects the one of the plurality of ALUs based on a folding parameter.

In an embodiment, a method comprises: executing, on a processor having an instruction set having a word size, an arithmetic operation on operands having the word size, the executing the arithmetic operation including: providing, using a multiplexing network of the processor, portions of the operands of the arithmetic operation to an arithmetic logic circuit (ALU) of the processor, the ALU having an operand size smaller than the word size of instruction set; generating, using the ALU, partial results of the arithmetic operation; accumulating, using a shift register of the processor, the shift register having the word size and coupled to an output of the at least one ALU, the partial results generated by the ALU; and generating a result of the arithmetic operation based on the accumulated partial results. In an embodiment, the method comprises: generating control signals to control the multiplexing network and to control the shift register. In an embodiment, the method comprises: selecting the ALU from a plurality of ALUs of the processor, each of the plurality of ALUs of the processor having a respective operand size smaller than the word size of the instruction set. In an embodiment, the method comprises: selecting the ALU from the plurality of ALUs based on a folding parameter.

In an embodiment, a non-transitory computer-readable medium's contents configure a processor having an instruction set having a word size to perform a method. The method comprises: executing an arithmetic operation on operands having the word size of the instruction set, the executing the arithmetic operation including: providing, using a multiplexing network of the processor, portions of the operands of the arithmetic operation to an arithmetic logic circuit (ALU) of the processor, the ALU having an operand size smaller than the word size of instruction set; generating, using the ALU, partial results of the arithmetic operation; accumulating, using a shift register of the processor, the shift register having the word size, the partial results generated by the ALU; and generating a result of the arithmetic operation based on the accumulated partial results. In an embodiment, the contents comprise instructions executed by the processor.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A processor, comprising:
a memory; and
arithmetic processing circuitry coupled to the memory, wherein the arithmetic processing circuitry, in operation, performs an arithmetic operation on M-bit operands over a number of clock cycles N, where M and N are positive integers greater than 1, the arithmetic processing circuitry including:
an L-bit arithmetic logic circuit (ALU), which, in a first mode of operation of the arithmetic processing circuitry, performs arithmetic operations on portions of the M-bit operands in clock cycles of the N clock cycles, generating L-bit partial results of the arithmetic operation on the M-bit operands, where L is a positive integer less than M;
a multiplexing network coupled to inputs of the L-bit ALU, wherein the multiplexing network, in the first mode of operation of the arithmetic processing circuitry, provides selected portions of the M-bit operands to the L-bit ALU in clock cycles of N clock cycles; and
an M-bit shift register coupled to an output of the L-bit ALU, wherein the M-bit shift register, in the first mode of operation of the arithmetic processing circuitry, accumulates the L-bit partial results generated by the L-bit ALU during clock cycles of the N clock cycles and outputs a result of the arithmetic operation on the M-bit operands based on the accumulated L-bit partial results, wherein N is selectable and the arithmetic processing circuitry comprises:
a Q-bit ALU, which, in a second mode of operation of the arithmetic processing circuitry, performs arithmetic operations on portions of the M-bit operands in clock cycles of the N clock cycles, generating Q-bit partial results of the arithmetic operation on the M-bit operands, where Q is a positive integer less than M and different from L, wherein, in the second mode of operation,
the multiplexing network provides selected portions of the M-bit operands to the Q-bit ALU in clock cycles of N clock cycles; and
the M-bit shift register accumulates the Q-bit partial results generated by the Q-bit ALU during clock cycles of the N clock cycles and outputs a result of the arithmetic operation on the M-bit operands based on the accumulated Q-bit partial results.

2. The processor of claim 1, wherein the L-bit ALU includes a number of processing elements greater than or equal to the positive integer L.

3. The processor of claim 1, wherein the processor is a reduced instruction set processor.

4. The processor of claim 3, wherein an instruction set of the processor has a word size of M-bits.

5. The processor of claim 1, wherein M, N and L are powers of 2.

6. The processor of claim 1, wherein N is a fixed value of 4.

7. The processor of claim 1, wherein the arithmetic processing circuitry comprises control logic, which, in operation, generates signals to control the multiplexing network and to control the M-bit shift register.

8. The processor of claim 1, wherein the arithmetic processing circuitry comprises an M-bit ALU, and in a second mode of operation, the M-bit ALU performs an arithmetic operation on M-bit operands in a clock cycle.

9. A system, comprising:
a memory; and
a processor coupled to the memory, wherein the processor, in operation, executes an instruction set having a word size, the processor including arithmetic processing circuitry, which, in operation, executes arithmetic operations on operands having the word size, the arithmetic processing circuitry including:
a plurality of arithmetic logic circuits (ALUs) having respective different operand sizes which are smaller than the word size of the instruction set;
a multiplexing network coupled to inputs of the plurality of ALUs; and
a shift register having the word size of the instruction set and coupled to outputs of the plurality of ALUs, wherein the arithmetic processing circuitry, in operation:
selects a mode of operation of a plurality of modes of operation of the arithmetic processing circuitry;
selects an ALU of the plurality of ALUs based on the selected mode of operation;
provides, using the multiplexing network, selected portions of operands of an arithmetic operation to the selected ALU in clock cycles of a plurality of clock cycles, a number of the plurality of clock cycles being based on the selected mode of operation;
performs, using the selected ALU, arithmetic operations on the provided portions in clock cycles of the plurality of clock cycles, generating partial results of the arithmetic operation;
accumulates, using the shift register, the partial results generated by the selected ALU during the plurality of clock cycles; and
outputs a result of the arithmetic operation based on the partial results accumulated by the shift register.

10. The system of claim 9, wherein the arithmetic processing circuitry comprises control logic, which, in operation, generates signals to control the multiplexing network and to control the shift register.

11. The system of claim 10, wherein the arithmetic processing circuitry includes an additional ALU having an operand size equal to the word size of the instruction set.

12. The system of claim 11, wherein the control logic, in operation, selects the ALU of the plurality of ALUs to perform an arithmetic operation over the plurality of clock cycles.

13. The system of claim 9, wherein the arithmetic processing circuitry, in operation, selects the mode of operation based on a folding parameter.

14. A method, comprising:
executing, on a processor having an instruction set having a word size, an arithmetic operation on operands having the word size, the executing the arithmetic operation including:
selecting a mode of performing the arithmetic operation of a plurality of modes of performing the arithmetic operation;
selecting an arithmetic logic circuit (ALU) from a plurality of ALUs of the processor based on the selected mode, the plurality of ALUs having respective different operand sizes smaller than the word size of the instruction set;
providing, using a multiplexing network of the processor, selected portions of the operands of the arithmetic operation to the selected ALU of the processor in clock cycles of a plurality of clock cycles, a number of the plurality of clock cycles being based on the selected mode;
generating, using the selected ALU, partial results of the arithmetic operation in clock cycles of the plurality of clock cycles;
accumulating, using a shift register of the processor, the shift register having the word size and coupled to an output of the selected ALU, the partial results generated by the ALU during the plurality of clock cycles; and
generating a result of the arithmetic operation based on the accumulated partial results.

15. The method of claim 14, comprising:
generating control signals to control the multiplexing network and to control the shift register.

16. The method of claim 14, comprising:
selecting the mode based on a folding parameter.

17. A non-transitory computer-readable medium having contents which configure a processor having an instruction set having a word size to perform a method, the method comprising:
executing an arithmetic operation on operands having the word size of the instruction set, the executing the arithmetic operation including:
selecting a mode of performing the arithmetic operation of a plurality of modes of performing the arithmetic operation;

selecting an arithmetic logic circuit (ALU) from a plurality of ALUs of the processor based on the selected mode, the plurality of ALUs having respective different operand sizes smaller than the word size of the instruction set;

providing, using a multiplexing network of the processor, selected portions of the operands of the arithmetic operation to the selected ALU of the processor in clock cycles of a plurality of clock cycles, a number of the plurality of clock cycles being based on the selected mode;

generating, using the selected ALU, partial results of the arithmetic operation in clock cycles of the plurality of clock cycles;

accumulating, using a shift register of the processor, the shift register having the word size and coupled to an output of the selected ALU, the partial results generated by the ALU during the plurality of clock cycles; and generating a result of the arithmetic operation based on the accumulated partial results.

18. The non-transitory computer-readable medium of claim 17, wherein the contents comprise instructions executed by the processor.

19. The system of claim 9, wherein the word size is 32 bits, and the plurality of ALUs includes:

an ALU having 8 bit operands;

an ALU having 4 bit operands; and an ALU having 2 bit operands.

20. The method of claim 14, wherein the word size is 32 bits, and the plurality of ALUs includes:

an ALU having 8 bit operands;

an ALU having 4 bit operands; and an ALU having 2 bit operands.

\* \* \* \* \*